United States Patent [19]
Biswas et al.

[11] Patent Number: 5,888,926
[45] Date of Patent: Mar. 30, 1999

[54] PROCESS FOR FORMING A SORBENT-METAL COMPLEX BY EMPLOYING A SORBENT PRECURSOR

[75] Inventors: Pratim Biswas, Symmes Township, Ohio; Timothy M. Owens, Gaithersburg, Md.

[73] Assignee: University of Cincinnati, Cincinnati, Ohio

[21] Appl. No.: 519,889

[22] Filed: Aug. 28, 1995

[51] Int. Cl.$^6$ .............................. B01J 20/02; B01D 47/00; C10L 1/10; F23J 7/00
[52] U.S. Cl. ......................... 502/406; 502/407; 502/411; 502/414; 423/210; 44/300; 44/602; 44/604; 44/642; 44/627; 44/620; 44/320; 44/354; 44/358; 431/4; 110/342
[58] Field of Search .................................. 502/406, 414, 502/407, 411, 400; 423/210; 44/300, 602, 604, 642, 620, 320, 354, 358; 431/4, 126; 110/342

[56] References Cited

U.S. PATENT DOCUMENTS

| | | | |
|---|---|---|---|
| 3,642,521 | 2/1972 | Molzan et al. | 117/105.2 |
| 4,508,841 | 4/1985 | Onuma et al. | 423/628 |
| 4,824,441 | 4/1989 | Kindig | 431/4 |
| 5,245,120 | 9/1993 | Srinivasachar et al. | 588/256 |
| 5,513,584 | 5/1996 | Rodriquez et al. | 431/4 |

OTHER PUBLICATIONS

Uberoi, M. et al., "Sorbents for Removal of Lead Compounds from Hot Flue Gases", *AIChE Journal*, vol. 36, No. 2, pp. 307–309, Feb., 1990.

Ho, T. C. et al., "Metal Capture During Fluidized, Bed Contaminated with Lead" *Combust. Sci. and Technol.*, vol. 85, pp. 101–116, 1992.

Uberoi, M. et al., "High–Temperature Removal . . . Using Solid Sorbents", *Environ. Sci. Technol.*, vol. 25, No. 7, pp. 1285–1289, 1991.

Scotto, M. et al., "Hazardous Waste Incineration: The In–Situ Capture of Lead by Sorbents in a Laboratory Down–Flow Combustor", 24th International Symposium on Cumbustion, Jul. 5–10, 1992.

*Primary Examiner*—Glenn Caldarola
*Assistant Examiner*—In Suk Bullock
*Attorney, Agent, or Firm*—Wood, Herron & Evans, L.L.P.

[57] ABSTRACT

This invention is directed to a process for forming a sorbent-metal complex. The process includes oxidizing a sorbent precursor and contacting the sorbent precursor with a metallic species. The process further includes chemically reacting the sorbent precursor and the metallic species, thereby forming a sorbent-metal complex. In one particular aspect of the invention, at least a portion of the sorbent precursor is transformed into sorbent particles during the oxidation step. These sorbent particles then are contacted with the metallic species and chemically reacted with the metallic species, thereby forming a sorbent-metal complex. Another aspect of the invention is directed to a process for forming a sorbent-metal complex in a combustion system. The process includes introducing a sorbent precursor into a combustion system and subjecting the sorbent precursor to an elevated temperature sufficient to oxidize the sorbent precursor and transform the sorbent precursor into sorbent particles. The process further includes contacting the sorbent particles with a metallic species and exposing the sorbent particles and the metallic species to a complex-forming temperature whereby the metallic species reacts with the sorbent particles thereby forming a sorbent-metal complex.

56 Claims, 3 Drawing Sheets

PROCESS FOR FORMING A SORBENT-METAL COMPLEX BY EMPLOYING A SORBENT PRECURSOR

FIELD OF THE INVENTION

This invention relates to absorbing, adsorbing or entrapping a substance with a sorbent material, and more particularly, to forming a sorbent-metal complex by employing a sorbent precursor. In one aspect of the invention, the process may be used to control or reduce metal emissions from a combustion system by introducing a sorbent precursor into the combustion and generating a sorbent material in situ within the combustion system.

BACKGROUND OF THE INVENTION

Toxic metals may enter a combustion system in many physical and chemical forms, for example, as constituents of a hazardous or municipal solid waste to be incinerated or as trace quantities in coal. In fact, studies have shown that coal combustion and waste incineration are the two major contributors to atmospheric loading of toxic metals such as antimony, arsenic, cadmium, selenium, vanadium, lead and zinc. Once introduced into a combustion environment, a metal may undergo transformations to different phases as well as to different chemical species depending upon combustion conditions and the presence of chlorine and other reactive species. Also, at combustion temperatures, metals may be vaporized and then undergo nucleation to form a submicron aerosol, or the metal vapor may condense onto existing particles. These resulting particles, formed by nucleation or condensation, have been observed to have a diameter of approximately 0.02 $\mu$m. Through growth by condensation of vapor or by coagulation with other particles, these particles ultimately may have a diameter of from about 0.02 $\mu$m to about 1.0 $\mu$m in the flu gas. For example, in one study on hospital waste incineration, a bimodal distribution in the flu gas was observed, and the particles having a diameter between about 0.1 $\mu$m and 0.2 $\mu$m accounted for 7% to 74% of the lead, 62%–77% of the cadmium, and 20%–80% of the zinc in the total particulate phase. (Kauppinen, E. I. and Pakkanen, T. A., "Mass and Trace Element Size Distributions of Aerosols Emitted by a Hospital Refuse Incinerator", *Atmos. Environ.*, 24A, 423 (1990).

Unfortunately, flu gas cleaning equipment used in combustion systems is least efficient in capturing particles having diameters in the submicrometer size range. For example, electrostatic precipitators are used in many coal-fired combusters and typically exhibit the lowest collection efficiency for particles less than 1 $\mu$m in diameter. Particles in these size ranges potentially pose a greater health threat than larger particles since they penetrate deeper into the lungs where the toxic materials come into contact with the blood. This potential adverse health impact of metal emissions from combustion devices is an appropriate incentive to investigate new methods and technologies for metal removal from waste gas streams. Furthermore, the United States Environmental Protection Agency (US EPA) has begun to regulate toxic metal emissions from combusters pursuant to Title III of the 1990 Clean Air Act Amendments which specifically lists eleven metals and their compounds as air toxics.

In an attempt to control such toxic metal emissions, researchers have proposed several control methods using various bulk solid sorbents to chemically adsorb various metals thereby reducing their discharge in particulate form into the atmosphere.

One such method includes combusting a metal contaminated waste in a fluidized bed of sorbent. (Oho, T., Chen, J., Hopper, J. and Oberacker, D., "Metal Capture During Fluidized Bed Incineration of Wastes Contaminated with Lead Chloride", *Combust. Sci. and Technol.*, 85, 101 (1992)). Other proposed methods include injecting a sorbent into the high temperature region of a combustion device (Scotto, M., Petersen, T. and Wendt, J., "Hazardous Waste Incineration: The In-Situ Capture of Lead by Sorbents in a Laboratory Down-Flow Combuster", 24*th International Symposium on Combustion*, the University of Sydney, Sydney, Australia (1992), and passing a metal vapor at high temperatures through a packed bed of sorbent (Uberoi, M. and Schadman, F., "High Temperature Removal of Cadmium Compounds Using Solid Sorbents", *Environ. Sci. Technol.*, 25, 7, 1285 (1991); and Uberoi, M. and Schadman, F., "Sorbents for Removal of Lead Compounds from Hot Flu Gases", *AIChE Journal*, 36, 2, 307 (1990)).

Although these bulk solid sorbent control methods may reduce metal emissions, they have several limitations. For example, because of mass transfer limitations with the bulk solid sorbent, the sorbent is not very efficient, and therefore, a large amount of sorbent must be used. More specifically, the metals may react with the surface of the bulk solid sorbent to form a metal-sorbent complex at the surface which plugs the pores of the sorbent and blocks access by the metals to the inner core volume of the bulk solid sorbent. This inhibits mass transfer of metal vapor to a significant active portion of the overall sorbent reactive surface, thereby severely limiting the efficiency of the bulk solid sorbent. In order to overcome this mass transfer limitation, the ratio of sorbent material to metals must be significantly increased thereby increasing not only raw material costs, but also post treatment costs incurred in land filling or otherwise disposing of the resulting large quantities of filtered or precipitated powdered material.

Therefore, it would be extremely desirable to have a method of reducing toxic metal emissions from a combustion system in which the system uses a sorbent material more efficiently, thereby providing enhanced capture and subsequent storage of toxic metals at a reduced cost.

SUMMARY OF THE INVENTION

This invention is directed to a process for forming a sorbent-metal complex. The process includes oxidizing a sorbent precursor and contacting the sorbent precursor with a metallic species. The process further includes chemically reacting the sorbent precursor and the metallic species, thereby forming a sorbent-metal complex.

In one particular aspect of the invention, at least a portion of the sorbent precursor is transformed into sorbent particles during the oxidation step. These sorbent particles then are contacted with the metallic species and chemically reacted with the metallic species, thereby forming a sorbent-metal complex.

Another aspect of the invention is directed to a process for forming a sorbent-metal complex in a combustion system. The process includes introducing a sorbent precursor into a combustion system and subjecting the sorbent precursor to an elevated temperature sufficient to oxidize the sorbent precursor and transform the sorbent precursor into sorbent particles. The process further includes contacting the sorbent particles with a metallic species and exposing the sorbent particles and the metallic species to a complex-forming temperature whereby the metallic species reacts with the sorbent particles thereby forming a sorbent-metal complex.

This invention provides many benefits and advantages. For example, the sorbent precursors employed in the invention do not suffer the mass transfer limitations encountered when using bulk solid sorbents. When a vapor or aerosol phase sorbent precursor is fed into a combustion system, the sorbent precursor quickly disperses throughout the combustion chamber and is able to form a high number of particles having an extremely high surface area per unit mass, thereby offering a much more efficient sorbent for capturing toxic metal emissions.

These and other benefits and advantages will become apparent upon review of the following brief description of the drawings and detailed description of the invention.

DETAILED DESCRIPTION OF THE PREFERRED EMBODIMENTS

The following journal article is incorporated herein in its entirety by reference: Owens, T. M., Wu, C. Y. and Biswas, P., "An Equilibrium Analysis for Reactions of Metal Compounds with Sorbents in High Temperature Systems", *Chemical Engineering Communications*, 133, pp. 31–52 (1995).

Figure 1:
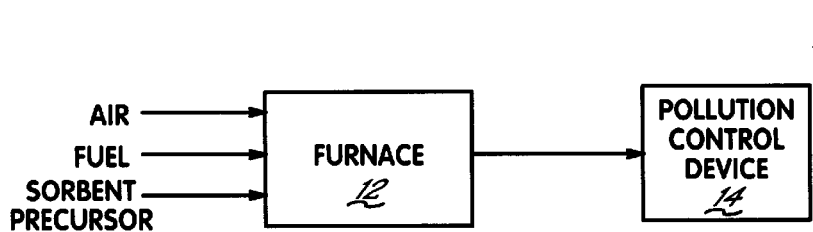
FIG. 1 is a flow diagram of a simple combustion system.

Referring to FIG. 1, a flow chart is shown depicting a simple combustion system 10 which may be used with the inventive process. Air (or any other suitable oxidizing agent) and fuel are introduced into the furnace 12 of the combustion system 10. The combustion system may be a simple system, such as the one shown which includes a pollution control device 14, or a more complex system including, for example, an afterburner chamber, an energy recovery device, a stack or the like. Some of the more typical combustion systems include coal combusters, waste incinerators, steel smelters and metal foundries, for example. In its broadest sense, however, the specific combustion system used may be any apparatus or environment capable of supporting the oxidation of a sorbent precursor. The fuel may be any substance capable of being combusted at combustion system temperatures. For example, the fuel may be natural gas, coal, fuel oil or solid waste. Many such fuels contain trace amounts of toxic metals which may be harmful if emitted to the environment in sufficient quantities and which may be controlled by using the current process.

In addition, a sorbent precursor is fed into the combustion system. As used herein, the term "sorbent precursor" refers to any compound which oxidizes to form a stable sorbent. Organometallic compounds are particularly useful as sorbent precursors. Several useful sorbent precursor compounds include an element such as silicon, aluminum, titanium and/or calcium. A few examples of such compounds include hexamethyl disiloxane, silicon tetrachloride, titanium tetraisopropoxide, aluminum isopropoxide and calcium acetate.

The sorbent precursor may be introduced to the combustion system as a solid, liquid, gas, vapor, aerosol or combination thereof. The liquid, gas, vapor and aerosol phases may be used to advantage because the sorbent precursor may be dispersed and mixed readily with the metal vapors existing in the combustion system. In addition, the energy required to disperse and mix a liquid or gas sorbent precursor should be less than that for a solid sorbent precursor.

The sorbent precursor may by introduced to the combustion system in any of a number of different ways. For example, a liquid sorbent precursor may be entrained in a carrier gas so as to form an aerosol which is delivered to the combustion system. Furthermore, the sorbent precursor may be introduced into the combustion system at any of a number of different locations along the system. For example, in a pulverized coal combuster, a sorbent precursor could be introduced prior to the furnace in the air stream that hydraulically conveys the pulverized coal to the furnace. Another strategy might be to coat the pulverized coal particles with a sorbent precursor solution upstream of the combustion chamber. For coal utilities, however, deposition onto heat exchanger surfaces must be considered. In this regard, tailoring of the agglomerate size distribution by increasing the sorbent precursor feed rate may prevent this potential problem. For rotary kiln incinerators, it may be more efficient to inject a vapor phase sorbent precursor into the duct work between the primary incinerator and the after burner, rather than mixing precursor solution with the waste prior to the primary incinerator.

In a combustion system as shown in FIG. 1, once the sorbent precursor is introduced into the combustion system 10, the precursor is subjected to an elevated temperature, usually in the furnace 12, sufficient to oxidize the precursor and transform the precursor into sorbent particles. It is preferred to use an elevated temperature of at least about 500° C. More preferably, the temperature is at least about 750° C., and most preferably, at least about 1000° C. The sorbent particles may be any oxide derivatives of the sorbent precursors used in the process. A few examples include silica, alumina, titania, calcium oxide and combinations thereof. Alternatively, the sorbent precursor may be oxidized by another method, such as hydrolysis, for example.

One of the advantages of the sorbent particles formed using the inventive method is their extremely high surface area to volume ratio relative to that of traditional bulk solid sorbents. The surface area to volume ratio of the sorbent particles generated using the inventive process generally is at least about 0.01 $nm^2/nm^3$, and preferably is at least about 0.06 $nm^2/nm^3$.

As the sorbent precursor is being oxidized in the combustion system, it is being exposed to a metallic species. The term "metallic species" refers to any metal, in atomic or molecular form, or any metal-containing compound. The metallic species may include, for example, lead, arsenic, beryllium, cadmium, cobalt, chromium, mercury, manganese, nickel, antimony, selenium, vanadium, zinc, barium and/or iron. The metallic species also may include any of the alkali metals, such as lithium, sodium, potassium, rubidium, cesium and/or francium.

The metallic species may be provided in any of a number of different states. For example, the metallic species may be a solid, liquid, gas, vapor or aerosol when the sorbent precursor is being exposed to the metallic species. Typically, however, in a conventional combustion system, the metallic species is in a vapor state, the vapor state being generated within the furnace portion of the combustion system simply by generating heat during the combustion process sufficient to vaporize a metallic species present in the fuel or which has been otherwise added to the combustion system. It is this metallic species vapor which is exposed to the sorbent precursor. If desired, this metallic species vapor may even be generated outside the combustion system and introduced into the system for contact with the sorbent precursor or sorbent particles. If a metallic species and sorbent precursor are introduced into the combustion system furnace, exposure of sorbent precursor to metallic species vapor usually will occur in the furnace region and/or downstream of the furnace.

A sorbent-metal complex is formed by chemically reacting the sorbent precursor and metallic species. It is believed that much if not most of the sorbent precursor is transformed into sorbent particles before chemical reaction with the metallic species to form a sorbent-metal complex. However, the chemical reaction step and transformation of sorbent precursor into a particulate form may overlap in time, such that sorbent precursor is reacting with a metallic species as that sorbent precursor is being transformed into sorbent particles.

In a preferred form of the invention, sorbent precursor and/or particles and metallic species are exposed to a complex-forming temperature whereby the metallic species reacts with the sorbent particles to form a sorbent-metal complex. This exposure to a complex-forming temperature causes at least a portion of the metallic species vapor to condense onto at least a portion of the sorbent particles, either after or during sorbent particle formation, and react with at least a portion of the sorbent particles, thereby forming a sorbent-metal complex.

The complex-forming temperature may be any temperature which enables the metallic species vapor to condense onto and react with the sorbent particles, i.e., the condensation temperature of the metal vapor. Generally, however, a temperature in the range of from about 0° C. to about 1330° C., and more preferably, from about 125° C. to about 1330° C., will cause the metallic species vapor to condense onto the surface of the sorbent particles. Furthermore, the preferred complex-forming temperature range may vary depending upon the composition of the sorbent particles. When the sorbent particles include silica, the complex-forming temperature preferably ranges from about 25° C. to about 1330° C., more preferably, from about 225° C. to about 1330° C. When the sorbent particles include alumina, the complex-forming temperature preferably ranges from about 0° C. to about 1330° C., more preferably, from about 125° C. to 1330° C. When the sorbent includes titania, the complex-forming temperature preferably ranges from about 25° C. to about 1330° C., more preferably, from about 325° C. to about 930° C.

If desired, the complex-forming temperature may be achieved by actively controlling (for example, reducing) the temperature of a portion of the combustion system which contains sorbent particles and metallic species vapor. However, such active control generally is not required because, in a typical combustion system, the temperature in the system is progressively cooler as one moves further downstream from the furnace. Unlike the methods which use bulk solid sorbents, such as packed bed and fluidized bed methods and the like, the inventive process is able to take advantage of this phenomenon. With these bulk solid sorbent methods, the sorbent is contained in a relatively short space within the combustion system, and therefore experiences a relatively narrow range of temperatures. Furthermore, the metallic species vapor must react with the sorbent in this same relatively short space and narrow temperature range. However, because specific sorbents and metallic species vapors are more reactive at certain temperatures, the particular sorbent and metallic species are unlikely to be interacting at their preferred temperatures over this short distance and narrow temperature range. With the present invention, on the other hand, neither the sorbent particles nor the metallic species vapor is confined to a narrow temperature range. Instead, the particles and vapor are able to move downstream away from the elevated temperature and react at a complex-forming temperature suited for efficient reaction between the particular sorbent particle compound and particular metallic species vapor. The sorbent particles provide a surface onto which the metal vapor condenses. In addition to condensing on the sorbent particles, the metallic species vapors react with the sorbent particles thereby forming a sorbent-metal complex.

If desired, the present process may be practiced so as to produce a sorbent-metal complex having a desired particle size range. For example, sorbent-metal particles having an increased average particle size may be produced by adjusting the amount of sorbent precursor and metallic species so as to increase the atomic sorbent-to-metal molar feed ratio. Likewise, sorbent-metal particles having a decreased average particle size may be produced by adjusting the amount of sorbent precursor and metal so as to decrease the atomic sorbent-to-metal molar feed ratio. This ability to control particle size enables an operator to tailor sorbent-metal complex particle size to the requirements of the particular pollution control device being used, such as a filter, electrostatic precipitator or the like, thereby preventing the release of at least a portion of the metal to the atmosphere. For example, for sorbent-metal particles having a mean particle size greater than about 1 $\mu$m, these particles may be removed by inertial deposition. While particles having a mean particles size less about 0.1 $\mu$m may be removed by diffusion. Once sorbent-metal particles have been collected, the particles may be disposed. Depending upon the water-leachable fraction of the particles collected, the sorbent-metal particles may be suitable for disposal at nonhazardous waste landfills.

EXAMPLES

The following examples are provided by way of illustration and are not intended to limit the scope of the invention, which is determined by the claims.

Experimental Apparatus and Method for Examples 1–6

Figure 2:
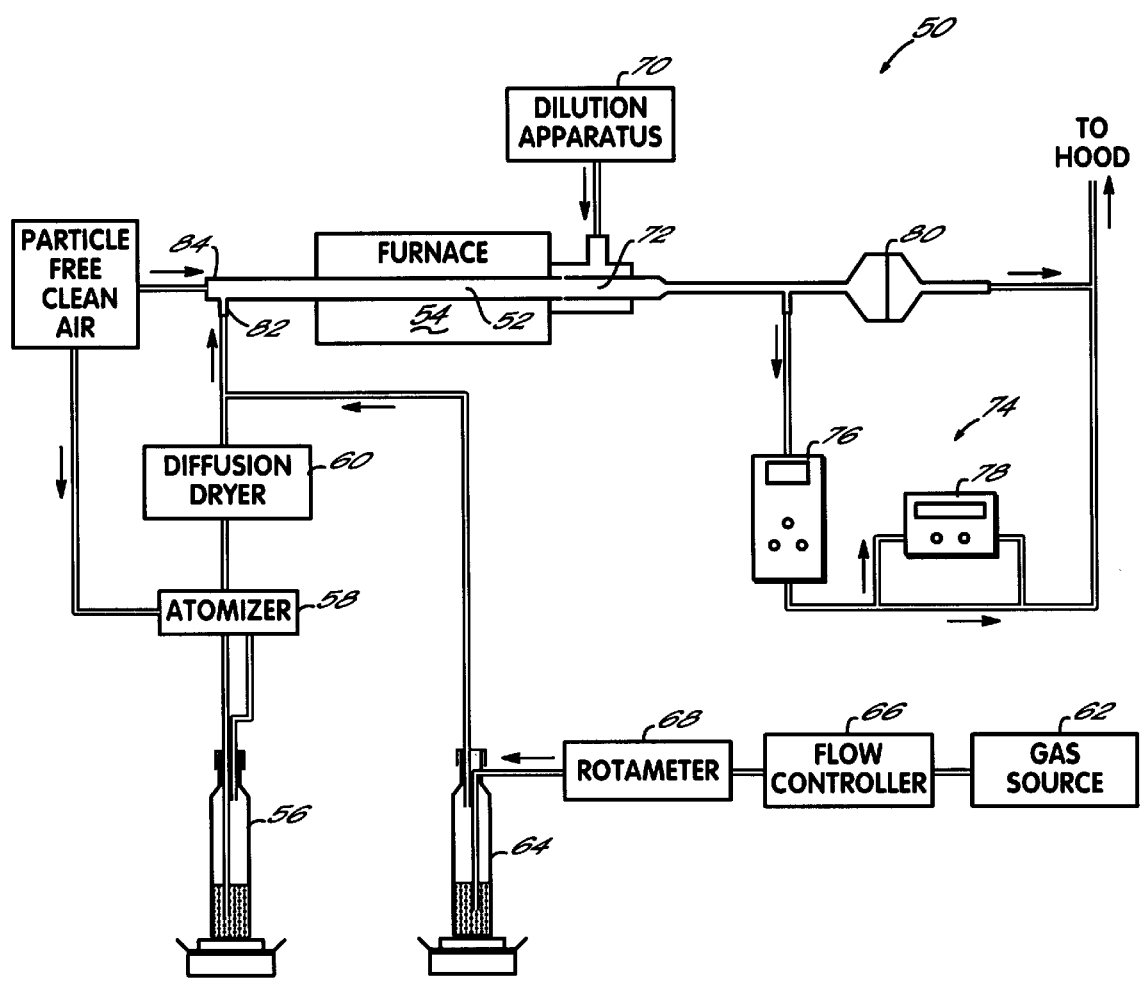
FIG. 2 is a schematic diagram of the experimental apparatus used to perform several of the examples.

Several experimental Examples were performed using the experimental apparatus shown in FIG. 2. This experimental apparatus 50 consisted of a one inch inner diameter alumina tubular flow reactor 52 which was maintained at different temperatures by a Lindbergh tube furnace 54 (Model 54434, $T_{max}$=1700° C.). For each experimental example, particle free clean air was fed into the reactor 52 through a main inlet 84. In the experiments, lead acetate was selected as the metal carrier because it decomposes at 200° C. and forms an oxide which is representative of lead in combustion environments. A lead acetate aerosol was formed by moving a solution of lead acetate from a container 56 through a constant output atomizer 58 (TSI, Inc., Model 3076) and passing the atomized solution through a diffusion dryer 60 to remove water and form the resulting lead acetate aerosol. This lead acetate aerosol, having a mean particle size of approximately 0.1 $\mu$m, was passed through a reactor inlet 82 into the reactor 52, where it decomposed to form lead oxide upon being subjected to temperatures greater than about 200° C. The sorbent precursor used in the experimental apparatus for the experimental examples was hexamethyl disiloxane. A sorbent precursor aerosol was formed by moving argon gas from a gas source 62 to a reservoir 64, and bubbling argon gas through the reservoir 64 thereby entraining droplets of the hexamethyl disiloxane liquid in the gas. This silica precursor aerosol then was fed to the reactor in conjunction with the lead acetate aerosol. Argon gas flow from the gas source 62 to the reservoir 64 was controlled and measured by a flow controller 66 and Rotameter 68. Reactor residence times for the particular metal and sorbent precursor feeds ranged from about 0.02 sec. to about 0.3 sec.

The experimental apparatus 50 further included a dilution apparatus 70 near the exit of the heated portion of the reactor 52 in order to introduce dilution air into the reacting gas stream as it exited the heated portion of the reactor 52. This dilution step was done to quench the aerosol dynamics and chemical reactions and also to dilute the samples for measurement by real-time particle sizing instrumentation. Although the dilution air had little effect on the temperature profile at the reactor exit 72, it did prevent further chemical reaction and aerosol dynamics which might possibly take place in the sampling line. Therefore, a representative measurement could be obtained at the reactor exit 72. A slip stream following the dilution apparatus 70 was directed to a scanning mobility particle sizer 74 (SMPS) (TSI, Inc., Model 3934) for particle size measurements. The SMPS 74 included a differential mobility analyzer (DMA) 76 connected to an optical particle counter (OPC) 78. The SMPS 74 measured the size distribution of the aerosol on a real time basis and provided information on mean particle size and deviation, particle number concentration (total number of particles/unit volume of gas, i.e., $M_0$, the zeroeth moment of the size distribution, #/cm$^3$), total particle surface area concentration (nm$^2$/cm$^3$) and total particle volume concentration (total volume of particles/unit volume of gas, i.e., $M_1$ the first moment of the size distribution, nm$^3$/cm$^3$). The bulk of the aerosol was collected on a glass fiber filter 80 for subsequent analysis by X-ray diffraction, infrared spectroscopy and Raman spectroscopy.

Example 1
Homogeneous Nucleation of a Metal Oxide Vapor

Figure 3A:
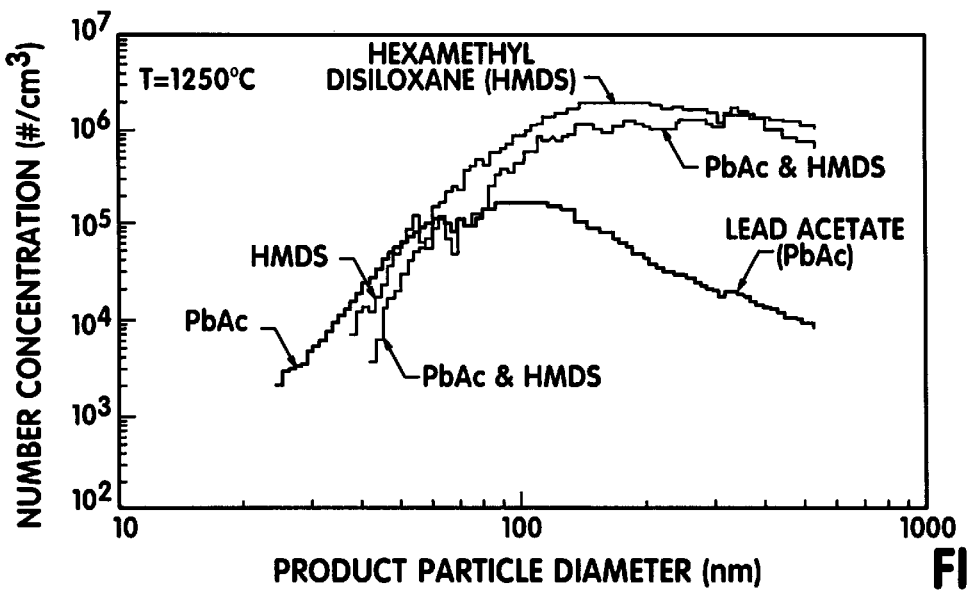
FIG. 3A is a graph of particle size distributions for particles exiting a reactor having a furnace temperature of 1250° C., using three different reactor feed conditions.
Figure 3B:
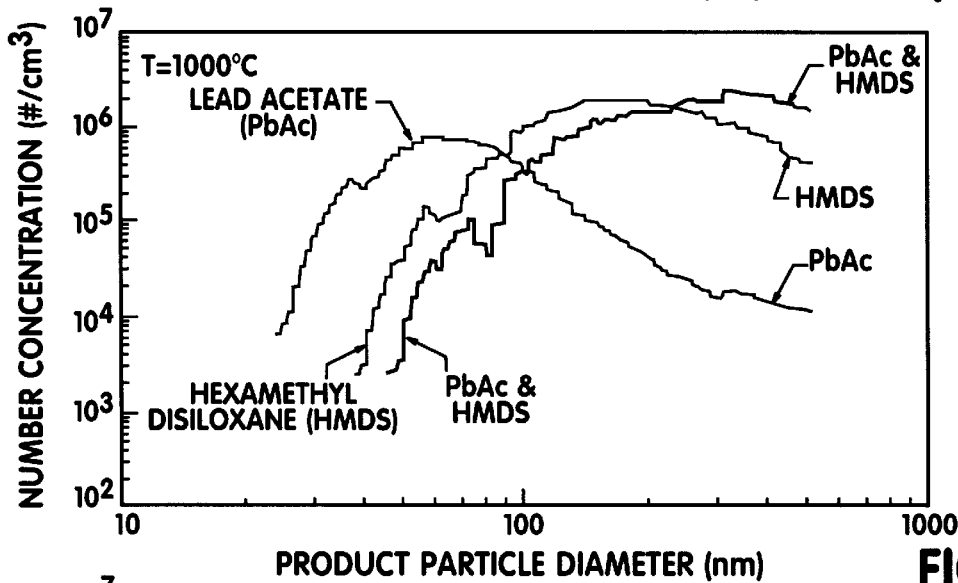
FIG. 3B is a graph of particle size distributions for particles exiting a reactor having a furnace temperature of 1000° C., using three different reactor feed conditions.
Figure 3C:
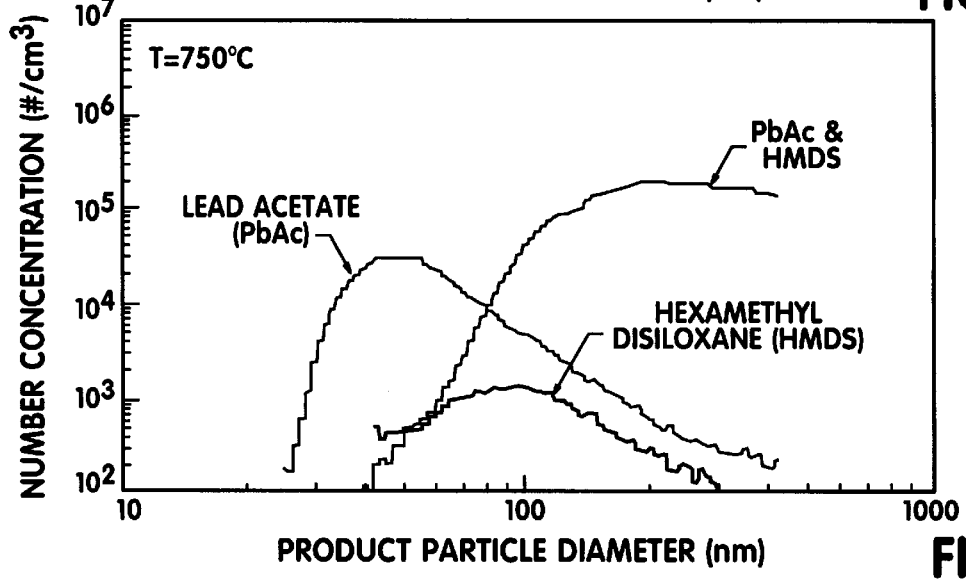
FIG. 3C is a graph of particle size distributions for particles exiting a reactor having a furnace temperature of 750° C., using three different reactor feed conditions.
Figure 4A:
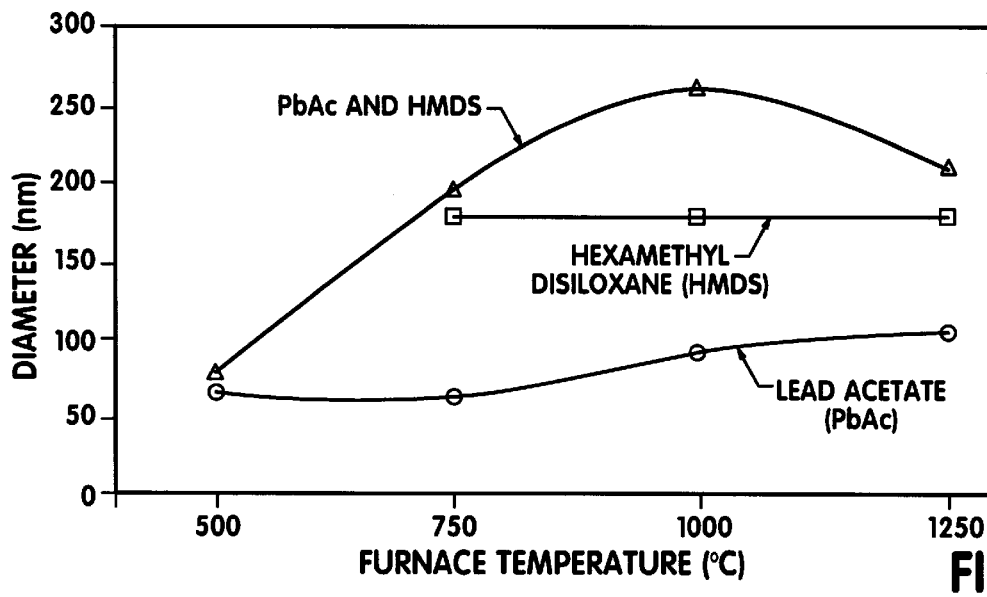
FIG. 4A is a graph of particle diameter for particles exiting a reactor under different reactor temperature and reactor feed conditions.
Figure 4B:
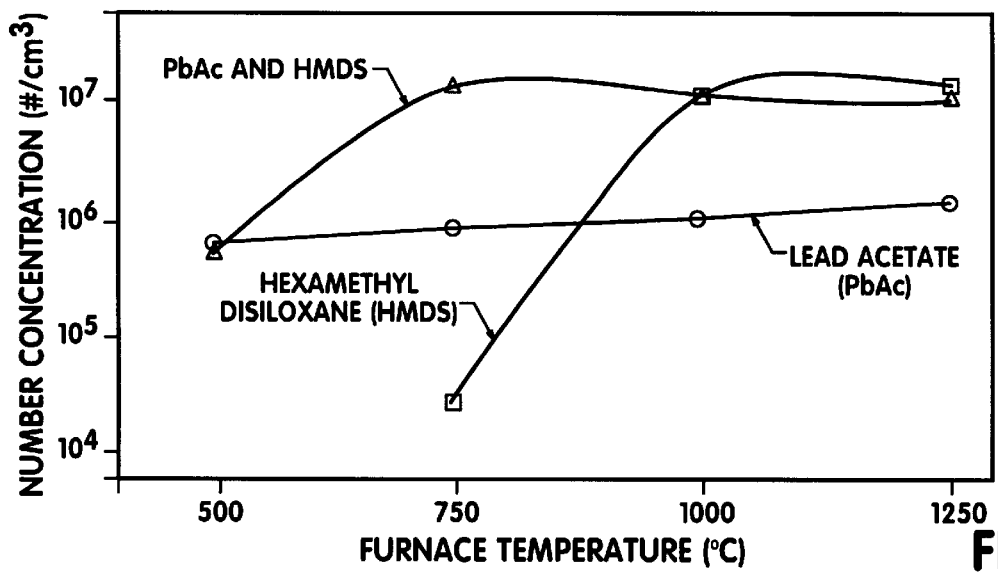
FIG. 4B is a graph of particle number concentration for particles exiting a reactor under different reactor temperature and reactor feed conditions.
Figure 4C:
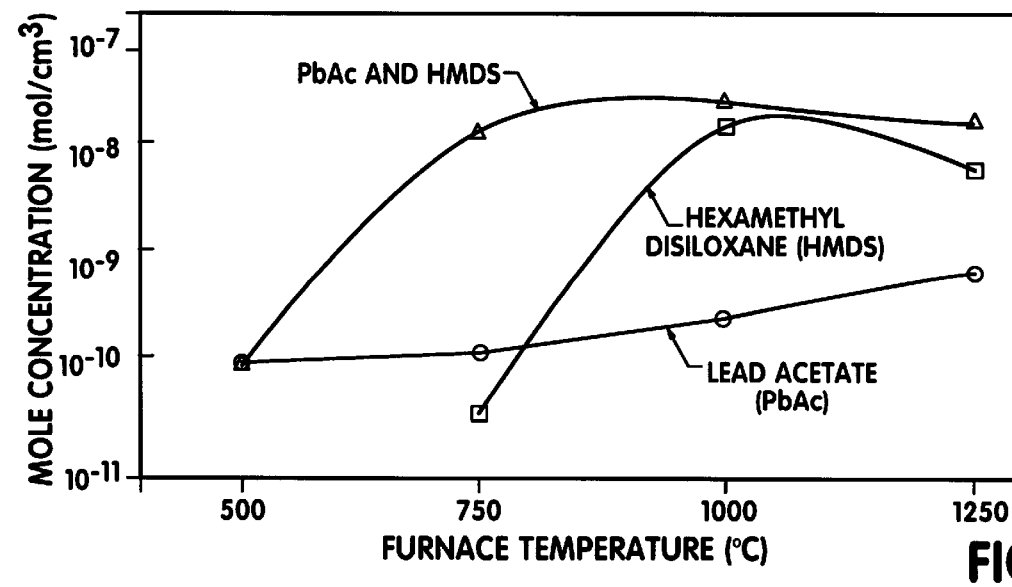
FIG. 4C is a graph of particle mole concentration for particles exiting a reactor under different reactor temperature and reactor feed conditions.

In four separate runs at four different temperatures, submicrometer sized lead acetate (PbAc) aerosol was fed into the reactor inlet. In each run, the PbAc was fed into the reactor at a rate of about $2.59 \times 10^{-7}$ mol/min, with the temperature of the runs being 500° C., 750° C., 1000° C. and 1250° C., respectively. The submicrometer sized lead acetate aerosol entered the reactor furnace and rapidly decomposed to form PbO in the presence of excess air. The PbO was in vapor form in the high temperature zone. As the gases exited the reactor, the temperature dropped and the PbO vapors attained supersaturation. The vapors then underwent nucleation to form particles which grew further by condensation and coagulation. Referring to FIGS. 3A–3C, the size distribution for particles exiting a reactor using a PbAc metal-only feed is roughly similar for the three furnace temperatures shown. Referring to FIG. 4A, the particle geometric diameter is relatively constant (approximately 60–100 nm) at all four reactor temperature conditions using a PbAc feed. Referring to FIGS. 4B and 4C, the number concentration and mole concentration at different reactor temperatures is relatively constant as well. These results, when compared to Pb inlet concentrations obtained from SMPS measurements, indicated that all of the Pb had been transformed into the particulate phase.

Example 2
Generation of Sorbent Particles from a Sorbent Precursor

In four separate runs at four different temperatures, hexamethyl disiloxane (HMDS) was fed into the reactor inlet. In each run, the HMDS was fed into the reactor at a rate of $2.32 \times 10^{-5}$ mol/min, with the temperature of the runs being 500° C., 750° C., 1000° C. and 1250° C., respectively. Referring to FIGS. 4A–4C, at a reactor temperature of 500° C., no particles were observed suggesting that the precursor had not been oxidized to form silica particles. However, particles were observed at the higher reactor temperatures. These particles had an average diameter of about 170 nm. Referring to FIGS. 3A–3C, particle size distribution is shown for particles formed using the HMDS sorbent precursor at various reactor temperatures. As shown in FIGS. 3A–3C, both the particle number concentration and mean diameter increase significantly when the reactor temperature is complex-forming from 750° C. to 1000° C. This result suggests a complete conversion of the HMDS into silica particles at reactor temperatures of 1000° C. and above. FIGS. 3A–3C show particle diameter ranging from about 40 nm to about 140 nm.

Example 3
Generation of Sorbent:Metal Particles

HMDS and lead acetate (PbAc) were introduced into the reactor inlet at an Si:Pb ratio of about 90:1. In four separate runs at reactor temperatures of 500° C., 750° C., 1000° C. and 1250° C., respectively. In each run, HMDS was fed into the reactor at a rate of $2.32 \times 10^{-5}$ mol/min, while PbAc was fed at a rate of $2.59 \times 10^{-7}$ mol/min. Referring to FIGS. 4A–4C, at a reactor temperature of 500° C. the measured size distribution parameters are nearly identical to those of the particles formed using only lead acetate as a feed. This result is expected since no silicon dioxide particles are formed at this reactor temperature. X-ray diffraction (XRD) analysis of the collected powder from this run showed the powder to be lead oxide (litharge). For a reactor temperature of 750° C., XRD analysis indicated the presence of lead oxide as well as an amphorous powder, which was subsequently identified by infrared (IR) spectroscopy as lead silicate ($PbSiO_3$). Referring to FIGS. 3A–3C and 4B, at reactor temperature conditions of 1000° C. and above, the particle number concentration for the lead plus silica precursor feed is similar to the particle number concentration for the silica precursor only feed. This result indicates that the lead oxide vapor is being scavenged by the silica particles before the metal oxide vapor has an opportunity to undergo homogenous nucleation. This suppression of metal oxide vapor nucleation has favorable implications for controlling toxic metal emissions.

Using calcium acetate as the sorbent precursor, five different runs were made in which calcium acetate and lead acetate were fed into the reactor inlet at a Pb:Ca molar feed ratio of 1:1. Two of the runs were performed at a reactor temperature of 750° C., while the subsequent runs were performed at temperatures of 1000° C. and 1200° C., respectively, with the resulting powder from each of the runs analyzed by XRD spectroscopy. Both 750° C. runs produced powders containing lead oxide (massicot and litharge). Additionally, the XRD results showed the powder from the first 750° C. to include $Ca_2PbO_4$, while the second 750° C. run was shown to include hydrocerussite. Analysis of the powder produced in the 1000° C. run showed the presence of hydrocerussite, while analysis of the 1200° C. powder showed the primary product to be plumbonacrite. The amphorous fraction of the 1200° C. sample was not analyzed to determine the presence or absence of any calcium-lead complexes.

Example 4
Ability to Form Sorbent Particles and Sorbent:Metal Particles Using Low Si:Pb Feed Ratios Using a reactor temperature of 1000° C., HMDS and lead acetate were fed into the reactor inlet at an Si:Pb feed ratio of 4.5:1. The HMDS was administered at a rate of $1.17 \times 10^{-6}$ mol Si/min, while the lead acetate was administered at a rate of $2.59 \times 10^{-7}$ mol Pb/min. XRD analysis of the particles collected from this run indicated that no lead oxide was formed. This result coupled with the mass balance results, which showed the outlet lead compounds to be in the particulate phase, indicates relatively effective metal capture by the silica sorbent particles even at this low silica precursor feed ratio. A mass balance on lead was performed by collecting outlet lead compounds on a glass filter followed by a bubbler containing nitric acid (about 20%). The filter was placed in nitric acid (about 10%) and moderately heated for approximately 30 minutes. This solution and the bubbler solution were then analyzed on a Perkin Elmer (Zeeman background corrected Nodel No. 5100) graphite furnace atomic absorption spectrophotometer (AA) for lead.

Example 5
Ability to Vary the Size of the Sorbent:Metal Particles by Varying the Feed Ratio of the Sorbent and Metal Precursors HMDS and lead acetate were fed into the reactor inlet at an Si:Pb ratio of 840:1. The size distribution results were recorded by an optical particle counter (Particle Measuring Systems, Inc., Model LAS-X-CRT), because the particles generated had diameters beyond the range of the SMPS. The peak in the size distribution was located at approximately 800 nanometers, thereby indicating that the size of the silica particles (and therefore the silica/metal particles) may be increased by increasing the Si:Pb feed ratio.

Example 6
Reduction in Metal Leachability With Increased Sorbent-:Metal Molar Feed Ratios Using a reactor temperature of 1000° C. HMDS and lead acetate were fed into the reactor inlet at an Si:Pb molar ratio of 0.5:1. The HMDS was fed into the reactor at a concentration of $8.11 \times 10^{-8}$ mole Si/liter while lead acetate was fed into the reactor at a concentration of $1.68 \times 10^{-7}$ mole Pb/liter. The resulting powder was analyzed using XRD spectroscopy and found to contain primarily hyrdrocerussite and some massicot ("the low Si feed rate powder"). Another run was made at the same temperature, using an Si:Pb molar feed ratio of 29:1. In this run, the HMDS had a feed concentration of $4.81 \times 10^{-6}$ mole Si/liter while the lead acetate had a feed concentration of $1.68 \times 10^{-7}$ mole Pb/liter. The powder resulting from this feed rate was similarly analyzed and found to contain lead silicate ("the high Si feed rate powder").

In order to determine the water leachable fractions, each of the powders was subjected to a leachability test. Approximately 3 milligrams of powder from each sample were used in the tests. The liquid extract from the tests was analyzed by inductively-coupled plasma (ICP) spectroscopy (EPA Method 200.7). The lead extracted from the low Si feed rate powder (following 24 hours in ASTM type 2 water at a pH of 5.0) was approximately 98% of the original lead mass. However, using the same process, the lead extracted from the high Si feed rate powder was only about 63% of the original lead mass indicating a reduction in lead leachability when lead-silica complexes are formed. Note that while the leachability of the lead-silicate complex may appear to be sizable, this leachability test was conducted using an extremely aggressive water mass to sample mass ratio of 10,000:1, which is far more aggressive than the US EPA's toxicity characteristic leaching procedure (TCLP), which uses a water mass to sample mass ratio of only 16:1.

Experimental Apparatus and Method for Examples 7–14

Planar laser-based imaging measurements were used to provide in situ chemical information of a lead-silicon (Pb-Si) reaction system. Two dimensional imaging of gas phase lead oxide (PbO) fluorescence was used to illustrate the reactivity of lead species with silica sorbents.

In performing these experiments, two different experimental systems were used. The first set of experiments (Examples 7 and 8 below) were carried out using a water cooled, premixed burner mounted on a vertical translation stage. Methane-oxygen flames with appropriate dilution using nitrogen were used to obtain a stable premixed flame. In Example 7 presented in detail below, the lead (Pb) precursor, tetraethyl lead, was entrained in an argon stream by bubbling and was premixed with the fuel-oxidant mixture before being introduced into the flame environment. This system was used to elucidate PbO spectroscopy and obtain the laser induced fluorescence characteristics. In Example 8 presented in detail below, tetraethyl lead was introduced into the flame environment as discussed above, along with a co-feed of the silicon (Si) precursor, hexamethyl disiloxane (HMDS), which also was entrained in an argon stream by bubbling. The second set of experiments (Examples 9–14 below) were conducted by using a tubular flow reactor similar to that used for Examples 1–6 presented above. In this second set of experiments, the tetraethyl lead and HMDS each were entrained in an argon gas stream by bubbling and then were introduced into the furnace reactor.

The laser excitation source for the experiments was an XeCl excimer-pumped dye laser, operating at 10 Hz with a 30 ns pulse duration and approximately 5 mJ pulse energy, and 0.2 $cm^{-1}$ bandwidth. For the initial spectroscopy measurements, the cylindrical beam was directed through the flame region and the fluorescent intensity monitored as a function of the incident wavelength (from 565 nm to 572 nm). A photo-multiplier tube (PMT) was used to detect the fluorescent light intensities. To minimize contributions from scattering, a long pass filter (OG-590, Schott glass filter) was used to block light of wavelength less than 590 nm from being detected by the PMT. After selection of an excitation frequency, a cylindrical and spherical lens combination was used to convert the beam into a thin sheet and direct the beam over the measurement region. The laser energy and its spatial distribution were monitored during the experiments by directing a 5% reflection of the laser sheet onto a dye cell and recording the intensity with an intensified charge coupled device (ICCD) video camera and frame grabber computer board. A line filter (Corion P10-530 nm) was used for the light scattering measurements (no fluorescence at 530 nm).

The images obtained were averaged over 250 laser shots to improve the signal-noise ratio and were spatially averaged 2×2 pixels which is the effective resolution of the intensifier. All the image intensities then were corrected for camera dark background, flatfield uniform response of the camera and collection lens, and laser energy and spatial distribution. The flourescence images also were obtained with the laser detuned from the absorbtion transition. The flatfield correction was obtained by imaging uniform light from a standard, diffuse tungsten lamp, through the appropriate spectral filters for fluorescence or particle scattering. As mentioned above, the ICCD video images of laser induced fluorescence (LIF) from a static cell of dilute Rhodamine 590 dye in methanol were used to normalize the laser energy and vertical spatial distribution in the corrected images. The laser profile images were re-mapped from the ICCD video to the ICCD coordinates based on images obtained with the laser sheet masked.

Example 7
Metal-Only Feed in a Flame System

Tetraethyl lead was introduced into a flame system having a temperature of about 2400° K. The flame reactants were provided to the burner at a temperature of about 25° C. and at flow rates of 0.475 lpm $CH_4$, 1.25 lpm $O_2$ and 2.85 lpm $N_2$. The tetraethyl lead was fed at a rate of $1.095 \times 10^{-7}$ moles/sec. The tetraethyl lead entered the flame zone, decomposed and was oxidized to form lead oxide vapors. A PbO gas phase concentration image and an elastic light scattering image were made at a distance of about 50 mm from the burner exit. The vapor concentration reached a maxima and then decreased downstream. The decrease was due to the formation of PbO particles by nucleation from the gas phase.

Example 8
Metal and Sorbent Precursor Co-Feed in a Flame System

Tetraethyl lead and HMDS were introduced into a flame system having a temperature of about 2400° K. The flame reactants were provided to the burner at a temperature of about 25° C. and at flow rates of 0.475 lpm $CH_4$, 1.25 lpm $O_2$ and 2.85 lpm $N_2$. The tetraethyl lead was fed at a rate of $1.095 \times 10^{-7}$ moles/sec, and the HMDS was fed at a rate of $4.99 \times 10^{-7}$ moles/sec (an Si:Pb molar feed ratio of about 4.6:1). When the HMDS was added in conjunction with the tetraethyl lead, a large number of silica particles were formed in the high temperature zone as shown by an elastic light scattering image. These particles provided a surface for chemisorption of the PbO vapors, and the resultant PbO gas phase concentrations were lower as indicated by a PbO gas phase concentration image. In fact, comparison of the PbO gas phase concentration image with the one produced in Example 7 above showed a decrease of about 25% in the PbO gas phase concentration in the presence of silica particles. Analysis of the collected powders by Raman spectroscopy clearly indicated the presence of lead silicate particles along with a mix of PbO particles.

Example 9
Metal-Only Feed in a Furnace Reactor

Tetraethyl lead was introduced into a furnace reactor having a maximum furnace temperature of 1373° K, an average furnace temperature of 1270° K and a downstream temperature 35 mm from the reactor exit of 980° K. $O_2$ and $N_2$ were fed to the reactor at a temperature of 25° C. and at flow rates of 1.25 lpm $O_2$ and 2.85 lpm $N_2$. The tetraethyl lead was fed at a rate of $1.095 \times 10^{-7}$ moles/sec. A laser induced fluorescence (LIF) image showed that the PbO vapor phase concentration was highest at the reactor exit and decreased downstream as the temperature dropped due to conversion to particulate PbO. At further distances downstream, the PbO vapor phase concentration reached a constant value which was due to the PbO gas and particles reaching an equilibrium state.

Example 10
Metal and Sorbent Precursor Feed in a Furnace Reactor

Tetraethyl lead and HMDS were introduced into a furnace reactor having a maximum furnace temperature of 1373° K, an average furnace temperature of 1270° K and a downstream temperature 35 mm from the reactor exit of 980° K. $O_2$ and $N_2$ were fed to the reactor at a temperature of 25° C. and at flow rates of 1.25 lpm $O_2$ and 2.85 lpm $N_2$. The tetraethyl lead was fed at a rate of $1.095 \times 10^{-7}$ moles/sec, and the HMDS was fed at a rate of $4.99 \times 10^{-7}$ moles/sec. (an Si:Pb molar feed ratio of about 4.6:1).

Example 11
Metal and Sorbent Precursor Feed in a Furnace Reactor

Tetraethyl lead and HMDS were introduced into a furnace reactor having a maximum furnace temperature of 1373° K, an average furnace temperature of 1270° K and a downstream temperature 35 mm from the reactor exit of 980° K. $O_2$ and $N_2$ were fed to the reactor at a temperature of 25° C. and at flow rates of 1.25 lpm $O_2$ and 2.85 lpm $N_2$. The tetraethyl lead was fed at a rate of $1.095 \times 10^{-7}$ moles/sec, and the HMDS was fed at a rate of $1.1 \times 10^{-6}$ moles/sec. (an Si:Pb molar feed ratio of about 10:1).

Example 12
Metal and Sorbent Precursor Feed in a Furnace Reactor

Tetraethyl lead and HMDS were introduced into a furnace reactor having a maximum furnace temperature of 1373° K, an average furnace temperature of 1270° K and a downstream temperature 35 mm from the reactor exit of 980° K. $O_2$ and $N_2$ were fed to the reactor at a temperature of 25° C. and at flow rates of 1.25 lpm $O_2$ and 2.85 lpm $N_2$. The tetraethyl lead was fed at a rate of $1.095 \times 10^{-7}$ moles/sec, and the HMDS was fed at a rate of $2.3 \times 10^{-6}$ moles/sec. (an Si:Pb molar feed ratio of about 20:1).

Example 13
Metal-Only Feed in a Furnace Reactor

Tetraethyl lead was introduced into a furnace reactor having a maximum furnace temperature of 1223° K, an average furnace temperature of 1173° K and a downstream temperature 35 mm from the reactor exit of 955° K. $O_2$ and $N_2$ were fed to the reactor at a temperature of 25° C. and at flow rates of 1.25 lpm $O_2$ and 2.85 lpm $N_2$. The tetraethyl lead was fed at a rate of $1.095 \times 10^{-7}$ moles/sec.

Example 14
Metal and Sorbent Precursor Feed in a Furnace Reactor

Tetraethyl lead and HMDS were introduced into a furnace reactor having a maximum furnace temperature of 1223° K, an average furnace temperature of 1173° K and a downstream temperature 35 mm from the reactor exit of 955° K. $O_2$ and $N_2$ were fed to the reactor at a temperature of 25° C. and at flow rates of 1.25 lpm $O_2$ and 2.85 lpm $N_2$. The tetraethyl lead was fed at a rate of $1.095 \times 10^{-7}$ moles/sec, and the HMDS was fed at a rate of $4.99 \times 10^{-7}$ moles/sec. (an Si:Pb molar feed ratio of about 4.6:1).

Referring to Examples 10–12 above, as the Si:Pb molar feed ratio was increased, laser induced fluorescence imaging showed the PbO concentration leaving the reactor to be progressively lower with increasing Si:Pb molar feed ratios, which was due to the chemisorption of the PbO onto the silica particles inside the furnace reactor. In each example, this was followed by a further decrease in the PbO concentration as reaction continued at the outlet of the reactor. Because temperatures in Examples 9–14 were in a favorable range for PbO-silica particle reactions to occur, PbO vapor phase concentration measurements showed a higher degree of conversion (approximately 80%) relative to the degree of conversion observed in the premixed flame Examples 9 and 10 (approximately 25%).

Elastic light scattering images of Examples 9 and 10 indicate that silica particles are formed in the high temperature regions and the PbO vapors are scavenged by these particles. The effective rate of conversion to lead silicate is dependent on the transfer rate of PbO vapors to the silica particle surface and on the chemical reaction rate. Due to the large surface area to mass ratio of the silica particles formed, it is anticipated that solid state duffusional mass transfer will not be a limiting factor, a clear advantage of the present invention. This was demonstrated by Examples 10–12 and 14, in which high conversion efficiencies were observed with Si:Pb molar feed ratios as low as about 4.6:1.

For Examples 7 and 8, PbO gas concentration was studied as a function of time from the outlet burner nozzle. In Example 7, the PbO gas concentration increased as the precursor (tetraethyl lead) was oxidized in the flame, reached a maximum, and then decreased due to the conversion of PbO gas to PbO particles. The precursor decomposition rate was 761 $ns^{-1}$ and the particle nucleation rate was $1.5 \times 10^{-12}$ cc $mol^{-1}$ $sec^{-1}$. In Example 8, the PbO gas concentration increased at the same rate initially, indicating that the chemistries of precursor decomposition were independent. However, due to the presence of silica particles, the PbO vapors were scavenged and the peak concentration was lower.

For Examples 9–10 and 13–14, PbO gas concentrations were studied as a function of distance from the reactor outlet. In Examples 9 and 13, PbO vapors were formed in the furnace by precursor oxidation. The PbO vapor concentration decreased at the outlet of the reactor due to conversion to the particle phase as a result of the decrease in temperature. The drop in the PbO gas phase concentration was faster in Example 13 than in Example 9 because the lower temperatures used in Example 13 resulted in a higher particle formation rate.

In comparing Examples 9 and 13 (metal-only feed) with Examples 10 and 14 (metal and sorbent precursor co-feed), when a sorbent precursor was used, the PbO gas concentration at the reactor outlet was lower due to some of the PbO gas being scavenged by the silica particles inside the furnace. In fact, a comparison of PbO gas concentrations at the reactor outlet for Examples 9 and 10 showed a removal efficiency of PbO gas inside the reactor of about 60%. A similar comparison for Examples 13 and 14 showed a removal efficiency of about 75%. In Examples 10 and 14, the PbO gas concentration reached generally steady values after a distance of about 25 mm from the reactor exit. Analysis of the particles collected at this 25 mm downstream location indicted that there was no crystalline PbO in the samples, and Raman spectroscopy clearly indicated that the lead was bonded with the silica to form a lead silicate compound. Also, electron microscopy with EDAX illustrated that the lead was associated with the silica particles. These particle analysis results show that nucleation of the PbO vapors (observed in the metal-only feeds of Examples 9 and 13) is suppressed in the presence of silica particles. The overall removal efficiency of PbO gas in Example 10 was 80%, and the overall removal efficiency in Example 14 was 92%.

This invention provides many benefits and advantages. For example, the sorbent precursors employed in the invention do not suffer the mass transfer limitations encountered when using bulk solid sorbents. When a vapor or aerosol phase sorbent precursor is fed into a combustion system, the sorbent precursor quickly disperses throughout the combustion chamber and is able to form a high number of particles having an extremely high surface area per unit mass, thereby offering a much more efficient sorbent for capturing toxic metal emissions.

What is claimed is:

1. A process for forming a sorbent-metal complex, comprising the steps of:
   oxidizing at least a portion of a sorbent precursor, thereby forming sorbent particles, said sorbent precursor comprising an organometallic compound;
   contacting said sorbent precursor or said sorbent particles with a metallic species; and
   chemically reacting said sorbent precursor or said sorbent particles with said metallic species, thereby forming a sorbent-metal complex.

2. The process of claim 1 wherein said sorbent precursor is oxidized by a method selected from the group consisting of hydrolyzing said sorbent precursor, exposing said sorbent precursor to an elevated temperature, and combinations thereof.

3. The process of claim 1 wherein said chemical reacting step includes exposing said sorbent precursor, or, said sorbent particles, and said metallic species to an elevated temperature.

4. The process of claim 1 wherein said sorbent precursor includes an element selected from the group consisting of silicon, aluminum, titanium, calcium, and combinations thereof.

5. The process of claim 1 wherein said sorbent precursor is an organometallic compound.

6. The process of claim 1 wherein said sorbent precursor is selected from the group consisting of hexamothyl disiloxane, tetraethoxysilane, titanium tetralsopropoxide, aluminum isopropoxide, and combinations thereof.

7. The process of claim 1 wherein said sorbent particles are oxides of an element selected from the group consisting of aluminum, silicon, titanium, calcium, and combinations thereof.

8. The process of claim 1 wherein said metallic species includes a metal selected from the group consisting of lead, arsenic, beryllium, cadmium, cobalt, chromium, mercury, manganese, nickel, antimony, selenium, vanadium, zinc, barium, sodium, potassium, iron, and combinations thereof.

9. The process of claim 1 wherein said metallic species is a vapor.

10. The process of claim 1 wherein said sorbent precursor includes hexamethyl dislioxane, and said metallic species includes lead.

11. The process of claim 1 wherein said sorbent precursor is introduced into said combustion system in an amount sufficient to provide a molar feed ratio of sorbent precursor to metallic species of at least about 4.5:1.

12. The process of claim 10 wherein said sorbent precursor is introduced into said combustion system in an amount sufficient to provide an atomic molar feed ratio of silicon to lead of at least about 4.5:1.

13. The process of claim 1 wherein said sorbent-metal complex is in the form of sorbent-metal particles, said sorbent-metal particles having an average particle size which may be increased or decreased, respectively, by increasing or decreasing the molar feed ratio of said sorbent precursor to said metallic species.

14. A process for forming a sorbent-metal complex in a combustion system, comprising the steps of:
   introducing a sorbent precursor into a combustion system, said sorbent precursor comprising an organometallic compound;
   oxidizing at least a portion of said sorbent precursor, thereby forming sorbent particles;
   contacting said sorbent precursor or said sorbent particles with a metallic species; and
   chemically reacting said sorbent precursor or said sorbent particles with said metallic species, thereby forming a sorbent-metal complex.

15. The process of claim 14 wherein said sorbent precursor is oxidized by a method selected from the group consisting of hydrolyzing said sorbent precursor, exposing said sorbent precursor to an elevated temperature, and combinations thereof.

16. The process of claim 14 wherein said chemical reacting stop includes exposing said sorbent precursor, or said sorbent particles, and said metallic species to a complex-forming temperature.

17. The process of claim 14 wherein said sorbent precursor includes an element selected from the group consisting of silicon, aluminum, titanium, calcium, and combinations thereof.

18. The process of claim 14 wherein said sorbent precursor is an organometallic compound.

19. The process of claim 14 wherein said sorbent precursor is selected from the group consisting of hexamethyl disiloxane, tetrachloride, tetraethoxysilane, titanium tetraisopropoxide, aluminum isopropoxide, and combinations thereof.

20. The process of claim 14 wherein said sorbent particles are oxides of an element selected from the group consisting of aluminum, silicon, titanium, calcium, and combinations thereof.

21. The process of claim 14 wherein said metallic species includes a metal selected from the group consisting of lead, arsenic, beryllium, cadmium, cobalt, chromium, mercury, manganese, nickel, antimony, selenium, vanadium, zinc, barium, sodium, potassium, iron, and combinations thereof.

22. The process of claim 14 wherein said metallic species is a vapor.

23. The process of claim 14 wherein said sorbent precursor includes hexamethyl disiloxane, and said metallic species includes lead.

24. The process of claim 14 wherein said sorbent precursor is introduced into said combustion system in an amount sufficient to provide a molar feed ratio of sorbent precursor to metallic species of at least about 4.5:1.

25. The process of claim 23 wherein said sorbent precursor is introduced into said combustion system in an amount sufficient to provide an atomic molar feed ratio of silicon to lead of at least about 4.5:1.

26. The process of claim 14 wherein said sorbent-metal complex is in the form of sorbent-metal particles, said sorbent-metal particles having an average particle size which may be increased or decreased, respectively, by increasing or decreasing the molar feed ratio of said sorbent precursor to said metallic species.

27. The process of claim 15 wherein said elevated temperature is at least about 500° C.

28. The process of claim 15 wherein said elevated temperature is at least about 750° C.

29. The process of claim 15 wherein said elevated temperature is at least about 1000° C.

30. The process of claim 16 wherein said complex-forming temperature ranges from about 0° C. to about 1330° C.

31. The process of claim 16 wherein said complex-forming temperature ranges from about 125° C. to about 1330° C.

32. A process for forming a sorbent-metal complex in a combustion system, comprising the steps of:
   introducing a sorbent precursor into a combustion system, said sorbent precursor comprising an organometallic compound;
   subjecting said sorbent precursor to an elevated temperature sufficient to oxidize at least a portion of said sorbent precursor, thereby forming sorbent particles;
   contacting said sorbent precursor or said sorbent particles with a metallic species; and
   exposing said sorbent precursor, or said sorbent particles, and said metallic species to a complex-forming temperature whereby said metallic species reacts with said sorbent precursor or said sorbent particles, thereby forming a sorbent-metal complex.

33. The process of claim 32 wherein said sorbent precursor includes an element selected from the group consisting of silicon, aluminum, titanium, calcium, and combinations thereof.

34. The process of claim 32 wherein said sorbent precursor is an organometallic compound.

35. The process of claim 32 wherein said sorbent precursor is selected from the group consisting of hexamethyl disiloxane, tetraethoxysilane, titanium tetraisopropoxide, aluminum isopropoxide, and combinations thereof.

36. The process of claim 32 wherein said sorbent particles are oxides of an element selected from the group consisting of aluminum, silicon, titanium, calcium, and combinations thereof.

37. The process of claim 32 wherein said metallic species includes a metal selected from the group consisting of lead, arsenic, beryllium, cadmium, cobalt, chromium, mercury, manganese, nickel, antimony, selenium, vanadium, zinc, barium, sodium, potassium, iron, and combinations thereof.

38. The process of claim 32 wherein said metallic species is a vapor.

39. The process of claim 32 wherein said sorbent precursor includes hexamethyl disiloxane and said metallic species includes lead.

40. The process of claim 32 wherein said sorbent precursor is introduced into said combustion system in an amount sufficient to provide a molar feed ratio of sorbent precursor to metallic species of at least about 4.5:1.

41. The process of claim 39 wherein said sorbent-precursor is introduced into said combustion system in an amount sufficient to provide an atomic molar feed ratio of silicon to lead of at least about 4.5:1.

42. The process of claim 32 wherein said sorbent-metal complex is in the form of sorbent-metal particles, said sorbent-metal particles having an average particle size which may be increased or decreased, respectively, by increasing or decreasing the molar feed ratio of said sorbent precursor to said metallic species.

43. The process of claim 32 wherein said elevated temperature is at least about 500° C.

44. The process of claim 32 wherein said elevated temperature is at least about 750° C.

45. The process of claim 32 wherein said elevated temperature is at least about 1000° C.

46. The process of claim 32 wherein said complex-forming temperature ranges from about 0° C. to about 1330° C.

47. The process of claim 32 wherein said complex-forming temperature ranges from about 125° C. to about 1330° C.

48. The process of claim 1 wherein said sorbent particles have an average diameter of about 170 nm or less.

49. The process of claim 14 wherein said sorbent particles have an average diameter of about 170 nm or less.

50. The process of claim 32 wherein said sorbent particles have an average diameter of about 170 nm or less.

51. The process of claim 1 wherein said sorbent particles have a surface area to volume ratio of at least about 0.01 $nm^2/nm^3$.

52. The process of claim 1 wherein said sorbent particles have a surface area to volume ratio of at least about 0.06 $nm^2/nm^3$.

53. The process of claim 14 wherein said sorbent particles have a surface area to volume ratio of at least about 0.01 $nm^2/nm^3$.

54. The process of claim 14 wherein said sorbent particles have a surface area to volume ratio of at least about 0.06 $nm^2/nm^3$.

55. The process of claim 32 wherein said sorbent particles have a surface area to volume ratio of at least about 0.01 $nm^2/nm^3$.

56. The process of claim 32 wherein said sorbent particles claim amendments. have a surface area to volume ratio of at least about 0.06 $nm^2/nm^3$.

* * * * *

UNITED STATES PATENT AND TRADEMARK OFFICE
CERTIFICATE OF CORRECTION

PATENT NO. : 5,888,926

DATED : March 30, 1999

INVENTOR(S) : Biswas et al.

It is certified that error appears in the above-identified patent and that said Letters Patent is hereby corrected as shown below:

Claim 6, line 2 reads "hexamothyl" and it should read -- hexamethyl --.

Claim 6, line 3 reads "tetraIsopropoxide" and it should read -- tetraisopropoxide --

Claim 10, line 2 reads "dislioxane" and it should read -- disiloxane --.

Claim 16, line 2 reads "stop" and it should read -- step --.

Claim 19, line 3 reads "tetrachloride" and it should be deleted.

Claim 56, line 2 reads "particles claim amendments. have" and it should read -- particles have --.

Signed and Sealed this

Third Day of October, 2000

Attest:

Q. TODD DICKINSON

*Attesting Officer*     *Director of Patents and Trademarks*